United States Patent [19]
Konzorr
[11] 3,993,388
[45] Nov. 23, 1976

[54] CABLE CONNECTION FOR ELECTRICAL EQUIPMENT, PARTICULARLY ILLUMINATION EQUIPMENT ON BICYCLES

[75] Inventor: Hubert Konzorr, Unna, Germany
[73] Assignee: Union, Sils, van de Loo & Co., Frondenberg, Ruhr, Germany

[22] Filed: June 12, 1975
[21] Appl. No.: 586,238

[30] Foreign Application Priority Data
June 22, 1974 Germany ........................... 2430061

[52] U.S. Cl. ........................... 339/59 L; 339/88 R; 339/273 R
[51] Int. Cl.² ........................................ H01R 13/40
[58] Field of Search ............................... 339/59–63, 339/88, 90, 91, 176, 195, 196, 241, 252, 254, 255, 270, 273

[56] References Cited
UNITED STATES PATENTS

| | | | |
|---|---|---|---|
| 2,194,769 | 3/1940 | Reed | 339/91 R |
| 2,235,020 | 3/1941 | Jones | 339/61 R |
| 2,275,762 | 3/1942 | Horton | 339/60 M |
| 3,496,297 | 2/1970 | Brumberger | 339/176 R |

FOREIGN PATENTS OR APPLICATIONS

| | | | |
|---|---|---|---|
| 538,098 | 11/1931 | Germany | 339/195 R |
| 977,902 | 12/1964 | United Kingdom | 339/244 R |
| 345,116 | 3/1931 | United Kingdom | 339/61 R |

*Primary Examiner*—Joseph H. McGlynn
*Attorney, Agent, or Firm*—Max Fogiel

[57] ABSTRACT

A cable connection for use in conjunction with electrical equipment, particularly lighting equipment for bicycles, in which an insulator is provided with a contact member fastened therein. The contact member establishes electrical contact between at least one outside conductor leading to the exterior of the equipment, and an inside conductor leading to the interior of the equipment. The contact member applies stress to the conductors to maintain them in electrical contact by jamming or clamping against the conductors. The contact member is pressed into a recess of the insulator, and at least one of the conductors is jammed or clamped between the edges or walls of the recess, while the contact member is jammed into the latter.

14 Claims, 10 Drawing Figures

CABLE CONNECTION FOR ELECTRICAL EQUIPMENT, PARTICULARLY ILLUMINATION EQUIPMENT ON BICYCLES

BACKGROUND OF THE INVENTION

The present invention relates to a cable connection for electrical equipment for connecting at least one outside conductor to an inside conductor. The latter is, in turn, connected to an electrical design element of the equipment, in particular, to a cable connection for the illuminating equipment of bicycles. The illuminating equipment for bicycles involves mainly dynamos, headlights and tail lights.

In the case of bicycle lights, usually a conductor is represented by the frame so that one electrical connection from each illuminating item to the frame and only one additional conductor is necessary. With dynamos or generators for bicycles, only one conductor in the form of a cable leads from such a dynamo. As a rule, this cable is the end of the stator winding to which, as conductor, one or several cables are connected which lead to the vehicle lights which, in turn, are also connected to the frame of the vehicle.

With known dynamos, the end of the stator winding is equipped with a solder-fastened or crimped connecting eyelet and fastened to a screw whose shaft passes through the bottom cap (made of insulating material) of the dynamo and is kept in the mounting position by an attached nut. To the screwshaft section extending from the bottom cap of the dynamo to the outside, the connecting eyelets of the cables leading to the consuming device are attached and fastened by means of a nut.

The above-described cable connection has been used with practically no change for many years. In spite of this long-standing use, the solution known in the art, in view of its expensive construction from a large number of individual parts, which have to be assembled by hand in the proper sequence, appears to be highly unsatisfactory.

Also from a technical viewpoint, the known solution does not meet the requirements to be made, because when soldering or using the cheaper method of crimping connecting an eyelet to the thin and sensitive wire end of the stator winding, the notch effect may cause the wire cross-section to be damaged. Furthermore, in the connection area between connecting eyelet and wire end, breaks may occur, making the entire assembly useless.

Finally, when fastening the outside conductors by means of a handtightened locknut, while riding the vehicle, there ensures undesirable loosening of the cable connections. This impairs the contact and hence the vehicle illumination. With complete loosening of the connection, the cable ends may be enmeshed with the spokes of the wheels.

The outside connections conventional with headlights and tail lights, in a manner similar to dynamos, are also put into use by means of a screw extending through an insulator bushing in the housing of the illuminated equipment. The connecting eyelets of cables are slipped over this screw and fastened by means of nuts. These cable connectors also are found to be expensive and while riding, undesirable loosening may result so that contact is interrupted and the vehicle illumination is disturbed.

Accordingly, it is an object of the present invention to provide a cable connection to be used especially for illuminating equipment on bicycles which is distinguished by simple construction, easy assembly and high reliability.

Another object of the present invention is to provide a cable connection of the foregoing character which may be economically fabricated and has a substantially long operating life.

SUMMARY OF THE INVENTION

Starting with the previously described state of the art, the objects of the present invention are achieved by providing that the ends of an inside conductor and of at least one outside conductor are kept in electrical contact under tension with a contact piece which is located in a recess inside an insulator and is fastened by jamming or clamping.

In an advantageous embodiment of the present invention, the contact piece is pressed into the recess in the insulator and at least one of the conductors, preferably the end of the stator winding of a bicycle dynamo, as inside conductor of the equipment, is jammed between the edges of the recess and contact piece pressed into it and thereby kept in electrical contact with the contact piece.

Another advantageous embodiment of the present invention provides for designing the contact piece as a circular contact plate or as a cylindrical contact sleeve, with this contact plate or contact sleeve pressed into a cylindrical insulator recess.

When using such contact pieces pressed into an insulator recess, contact with a conductor located between the contact piece and the walls of the insulator recess holding the contact piece, is accomplished in a simple manner. Furthermore, one may use aluminum conductors which up to now were unsuccessful because the attachment of connecting eyelets required expensive means. When establishing contact in accordance with the present invention, especially when the contact piece has a suitable profile of its contact surface, the oxide layer surrounding such aluminum conductors is penetrated so that also in this case, there is conductive contact between the aluminum proper and the contact piece.

In another embodiment of the present invention, the insulated ends of the outside conductors are jammed between the insulator and a section (inserted into the insulator recess) of a tensioning element connected to the insulator. The insulated ends of the outside conductors in the case of a contact plate are jammed between the front edge of a tensioning element section extending into the insulator recess, and in the case of a contact sleeve are jammed between the sleeve walls and the tensioning element section extending into the insulator recess. In place of a contact sleeve, one may also use a bolt pressed into a recess in the insulator. This bolt clamps the inside conductor between its outside surface and the insulator recess. The bolt, in turn, is surrounded by a cylindrical section of the tensioning element against whose inside surfaces the insulated outside conductor ends abut.

Within the scope of the invention, the tensioning element may also be a plug contact connected rigidly, but disconnectable to the insulator in such a way, that the insulator and the tensioning element are provided with positively locking connecting elements. These connecting elements may be means which attain their locked position due to spring tension, and mate cliplike. However, the connecting means may also have the form of the known bayonet type spring lock with the holding (locking) sections preferably provided with magnetic surfaces and/or grooves so that when turning the tensioning elements to the locked position, an additional spring tension assuring reliable contact can be provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
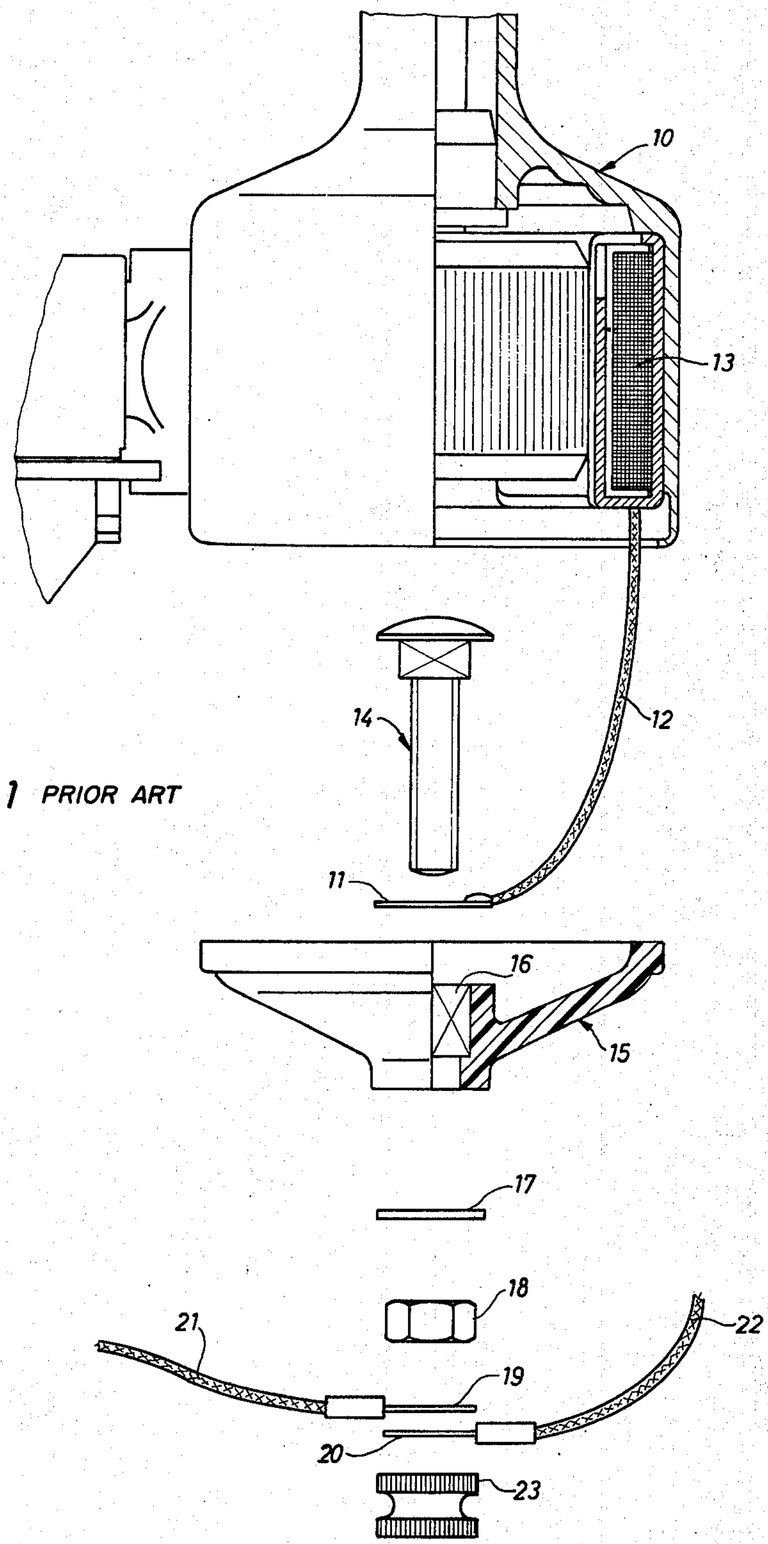
FIG. 1 is a partial exploded sectional view of a bicycle generator (dynamo) with means for bringing about a conventional connection wherein the dynamo bottom cap constitutes an insulator permeated by a contact.
Figure 2:
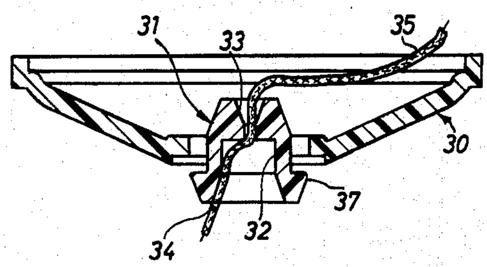
FIG. 2 shows a sectional view taken along line II—II of FIG. 6 of a dynamo bottom cap with a center section constructed as insulator, in accordance with the present invention, and with a recess through which extends an end of the stator winding extending out of the dynamo.

In the dynamo or generator 10, shown in FIG. 1, end 12, provided with a connecting eyelet 11, of stator winding 13, is fastened with a contact screw 14 to the plastic bottom cap 15 attached to the bottom of the dynamo housing and terminates the latter. In the installed condition, the shaft of contact screw 14 passes through the connecting eyelet 11 and the central recess 16 in bottom cap 15. A nut 18, with washer 17, is screwed onto the threaded part extending beyond the far side of the bottom cap. This assures a solid connection of end 12 of the stator winding with the contact screw. Onto the threaded shaft end extending beyond screw 18, the ends of cables 21, 22 serving as external conductors and provided with connecting eyelets 19, 20, are placed and held by attaching knurled nut 23.

The type of cable connector shown in the exploded view in FIG. 1, is of the conventional type used with bicycle dynamos or generators.

A bottom cap design different from the present state of the art is shown in FIG. 2 through 6. The plastic bottom cap 30 is provided with a center section serving as insulator. 31. This center section extends beyond both sides of the bottom cap wall. The center section contains a cylindrical wall 32 (accessible from the outside) to which is connected a channel 33 which passes through the insulator wall separating recess 32, from the inside of the dynamo. The end 34 of inside conductor 35 passes through this channel. This inside conductor is the end of the stator winding of a dynamo (not shown).

Figure 3:
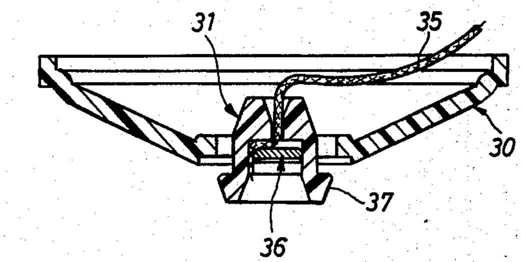
FIG. 3 shows a sectional view of the same bottom cap as FIG. 2, but with a contact plate inserted into the recess in the insulator, and held by friction while being electrically connected to the end of the stator winding.

In FIG. 3 a circular contact plate 36 is pressed into the cylindrical recess 32 of the insulator in such a way that end 34 of the inside conductor, passing through channel 33 and recess 32 to the outside, is jammed or clamped between the edge of the contact plate and the walls of cylindrical recess 32 holding the contact plate 36. The internal conductor end protruding beyond the contact plate and recess 32 is sheared off when the contact plate 36 is inserted (pressed in). Due to the jamming of the conductor end between the edges of the contact plate and the walls of recess 32 holding the contact plate, safe contact between conductor 35 and contact plate 36 is assured, which, if need be, can be further improved by providing the contact plate edge with teeth cutting into the conductor upon insertion.

Also, the center section 31 of bottom cap 36, constituting the insulator, is provided at its bottom end with holding sections 37, which, together with corresponding holding sections of a tensioning element yet to be described, constitute a bayonet type spring lock, and extend over predetermined peripheral angles along the circumference of the center section.

Figure 4:
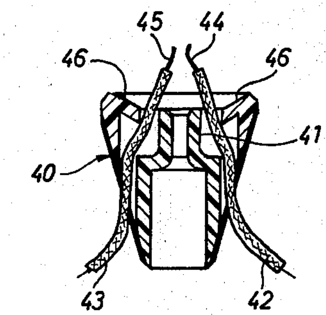
FIG. 4 shows a sectional view of a tensioning element rigidly attachable to, but disconnectable from the insulator of the bottom cap, with cables as outside conductors whose ends are insulated.

The tensioning element 40 shown in the sectional view of FIG. 4, is made of synthetic material, and has a center section 41 whose diameter is smaller than the inside diameter of the recess 32 in the insulator. Its length, however, corresponds to the depth of the recess. On both sides of this center section 41, there are cable channels through which pass cables 42, 43 with insulated ends 44, 45. Radially from center section 41 of the tensioning element, which is adapted to the cylindrical recess 32 in the insulator, there are located holding sections 46 adapted to the holding sections 37 of the insulator. Together with holding sections 37, they consititute a bayonet type spring lock.

In order to bring about the cable connection in accordance with the present invention, ends 44, 45 of the outside conductor cable 42, 43 are bent parallel to the forward front side of the tensioning element section 41. Then the tensioning element is slid from the bottom side onto the insulator 31 and, by turning the tensioning element, holding sections 37, 46 are brought to a positive interlocking position. Since holding sections 37, 46 only extend over preset peripheral angles, the tensioning element is easily slid onto the insulator, so that solid contact between the two design elements only requires a rotation (turn) interlocking the holding sections. This arrangement is not described here further, since bayonet type spring locks of this type are already well known in the art.

In the installation described above, the 44, 45, 44,45, bent parallel to the forward front side of tensioning element section 41, of outside conductor cables 42, 43, come in contact with the contact plate pressed into recess 32 so that there is electrical contact between contact plate and outside conductor. The depth of recess 32 in the insulator, the length of tensioning element section 41, and the holding sections 37, 46 are chosen so that the insulated ends 44, 45 of outside conductors are jammed between the front side of tensioning element section 41 and contact plate 36 pressed into the recess. This jamming effect can be further improved by providing holding sections 37, 46 of the bayonet type spring lock in an already known manner with magnetic surfaces which, upon rotating the tensioning element into the locked position, cause an increased tensioning force on the jammed conductor ends 44, 45.

Figure 5:
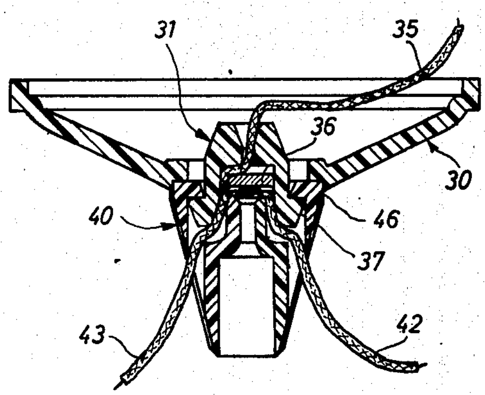
FIG. 5 shows a sectional view through a fully installed cable connector where the tensioning element is mounted on the insulator of the dynamo bottom cap, and the inside conductor and the outside conductor are kept electrically connected to the contact plate.
Figure 6:
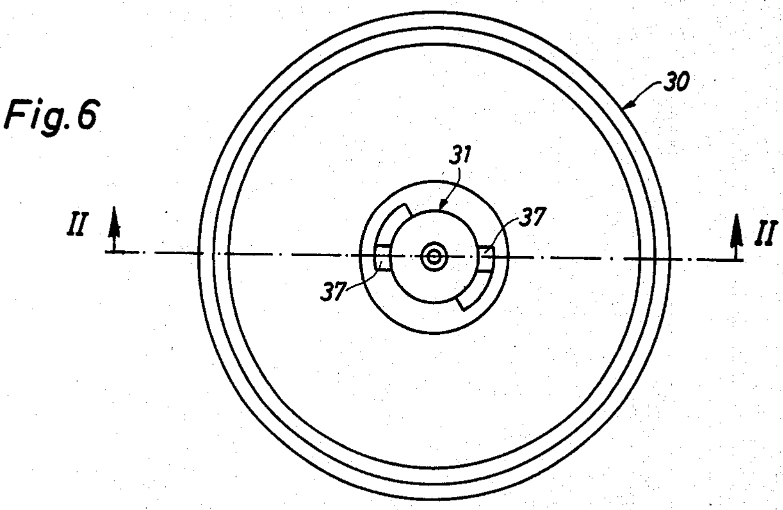
FIG. 6 is a top view onto the inside of the dynamo bottom cap with the center section constituting the insulator.
Figure 7:
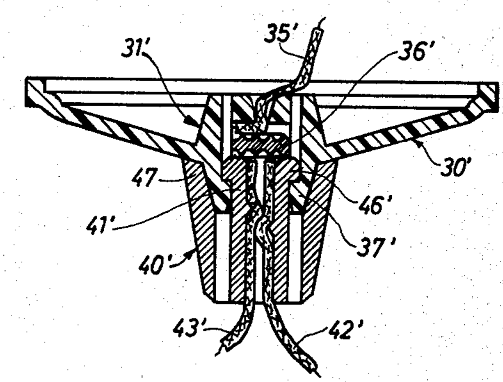
FIG. 7 shows a cable connector similar to FIG. 5 but with modified means for a disconnectable connection of the tensioning element to the insulator.

FIG. 5 shows a tensioning element 40 mounted on the center section (consisting an insulator) of bottom cap 30 with its associated outside conductors. Here, reliable contact between the insulated ends of outside conductors 42, 43 and the contact plate, on the one hand, and the end of inside conductor 35 and the contact plate, on the other hand, is assured. In the cable connection according to FIG. 5, in addition to making contact due to jamming of the cable ends, there is also tension relief on the outside conductor cables 42, 43, because their distance from the contact point with the contact plate 36 due to jamming in the cable channels, is kept essentially axially rigid. In the embodiment shown in FIG. 7, the parts identical with FIG. 2 through 6 are denoted by the same reference numbers, but are marked for the sake of distinction with a prime sign ('). Again, the same principle of making contact is used by means of a contact plate 36' pressed into a recess in insulator 31' with which the ends of conductors 35', 42', 43' are in contact under tension due to jamming. Deviating from the previously described embodiment, the holding sections 37' are located in the region of the inside boundary of the central insulator recess and the corresponding holding surfaces 46' of tensioning element 40' extend from the tensioning element's center section towards the outside. Tensioning element 40' concentrically surrounds that section of insulator 31' extending downward from bottom cap 30' with a ring section 47.

Figure 8:
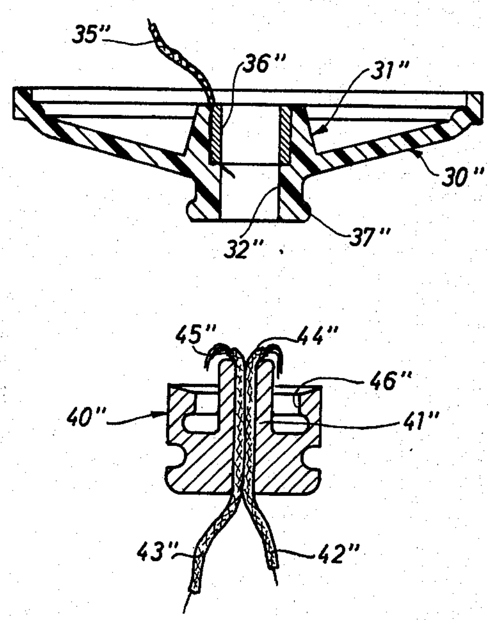
FIG. 8 is a sectional view and shows a further embodiment where a sleeve serves as contact piece pressed into the insulator recess, and an inside conductor jammed into the recess walls, is in contact with the outside wall of this sleeve.

In the embodiment shown in FIG. 8, identical parts from preceding figures are denoted by the same reference numerals, but are marked with a double prime sign (").

In this embodiment, the contact piece is a cylindrical sleeve 36" which is pressed into a central recess 32" of insulator 31". The latter is one piece with bottom cap 30". The end of inside conductor 35" is jammed between the outside wall of contact sleeve 36" and the recess accommodating the latter. The section of bottom section 31" extending downward from bottom cap 30" is provided with a circumferential edged beading 37 which forms a clip-like connection with the corresponding holding elements of tensioning element 40".

The plastic tensioning element 40" which has the form of a cap screw (nut), has a cylindrical center section 41" adapted to recess 32". In the final installed position, it protrudes into the contact sleeve 36". The outside conductor cables 42", 43" pass through the central recess in tensioning element 40", and the insulated ends 44", 45" of these outside conductor cables are bent around the forward front edge of the cylindrical center section 41". The edge of the tensioning element concentrically surrounding the center section 41" is provided on its inside with an edged beading 46" formed as a holding section. This edged beading in the installed position, locks positively with the edged beading 37 of insulator 37". If required, the peripheral edge of the tensioning element, which is in the shape of a cap nut, may be provided with slots which, during installation, assure radial avoidance of the holding elements provided by inside beading 46". With this embodiment, final installation takes place simply by sliding the tensioning element equipped with outside conductors onto insulator 31" of bottom cap 30", with holding element 46" snapping into a hold position in holding elements 37". The insulated ends 44", 45" of the outside conductors are jammed between the inside walls of contact sleeve 36' and the outside walls of cylindrical tensioning element section 41".

Figure 9:
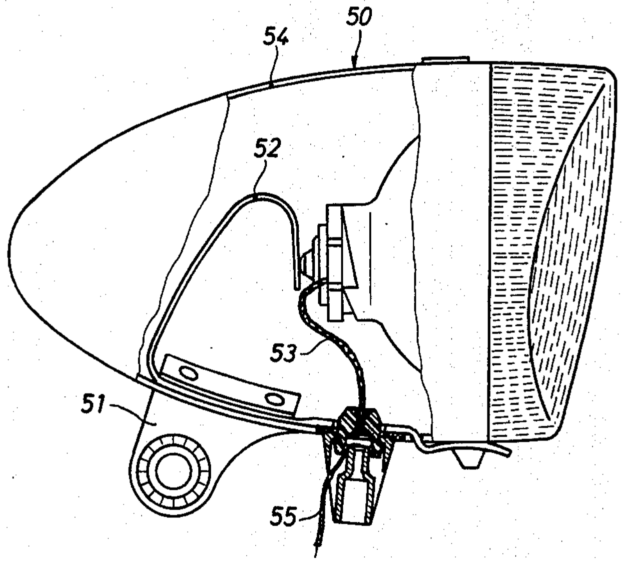
FIG. 9 shows the application of the invention with a conventional bicycle headlight and a metal housing.

With the bicycle headlight 50 illustrated in FIG. 9, the outside connection is realized in the manner described in FIG. 5. The frame contact with the bicycle frame (of no interest here) is accomplished by contact spring 52 connected to the headlight mounting bracket 51. An inside conductor 53 is in contact with an insulated end with the incandescent lamp base and jammed (clamped) between the latter and the lamp socket. A recess located at the bottom side of the metal lamp housing 54 holds a collective contact element of insulating material whose design is similar to the center section 31 of the bottom cap, shown in FIG. 2, of a dynamo. The end of the inside conductor 53 away from the incandescent lamp is inserted into this contact element, and contact with an outside conductor is made via a contact collection plate and a tensioning element in accordance with FIG. 4, into which an outside conductor 55 is introduced. In the installed condition, the latter makes contact with an insulated end with the contact plate pressed into the collective contact element.

Figure 10:
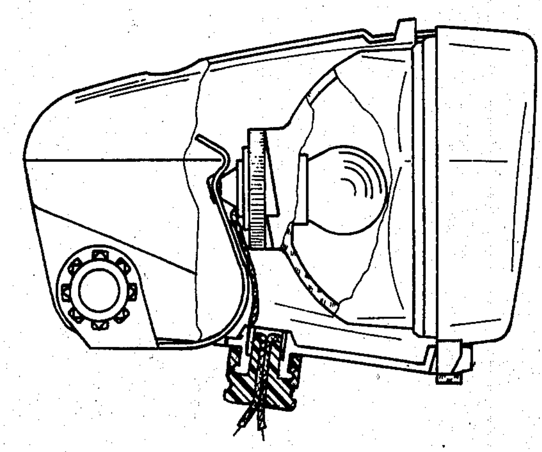
FIG. 10 shows the application of the invention with a bicycle headlight and housing made of plastic material.

In the headlight design of FIG. 10, the collective contact element is made of one piece with the lamp housing made of synthetic or plastic material, and the outside connection is realized in the manner described with FIG. 8.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of the equivalence of the following claims.

I claim:

1. A cable connector in electrical equipment, particularly lighting equipment for bicycles, comprising an insulator; a contact member fastened in said insulator; at least one outside conductor leading to the exterior of said equipment; and an inside conductor leading to the interior of said equipment, said outside and inside conductors being held in electrical contact under stress by said contact member, the clamping of said outside conductor being independent of the point of contact with said contact member; and a stressing member connected to said insulator, said outside cable being jammed between said insulator and said stressing member at a location spaced from the point of electrical contact of said outside conductor.

2. A cable connector in electrical equipment, particularly lighting equipment for bicycles, comprising an insulator; a contact member held and fastened in said insulator; at least one outside conductor leading to the exterior of said equipment; at least one inside conductor leading to the interior of said equipment; a stressing member connected to said insulator; and contoured means for holding said outside conductor detachably firm to said insulator and in electrical contact with said inside conductor by said stressing member, said outside and inside conductors; having bared ends held in electrical contact under stress by said contact member, a section of said outside conductor spaced from the contact location between said conductors being clamped between portions of said insulator and said stressing member for freeing said contact location from tension.

3. The cable connector as defined in claim 2 wherein said contact member is jammed against said conductors for maintaining said conductors in electrical contact.

4. A cable connector in electrical equipment, particularly lighting equipment for bicycles, comprising an insulator; a contact member held and fastened in said insulator; at least one outside conductor leading to the exterior of said equipment; at least one inside conductor leading to the interior of said equipment; a stressing member connected to said insulator; and contoured means for holding said outside conductor detachably firm to said insulator and in electrical contact with said inside conductor by said stressing member, said outside and inside conductors having bared ends held in electrical contact under stress by said contact member; said insulator having a recess with edges and walls, said contact member being pressed into said recess, at least one of said conductors being jammed between said edges and walls of said recess and said contact member.

5. The cable connector as defined in claim 4 wherein said conductor jammed between said edges and walls of said recess in said insulator comprises the inside conductor.

6. The cable connector as defined in claim 4 wherein said insulator has a cylindrical recess, said contact member comprising further a circular contact plate pressed into said cylindrical recess.

7. The cable connector as defined in claim 4 wherein said insulator has a cylindrical recess, said contact member comprising further a sleeve member pressed into said cylindrical recess.

8. A cable connector in electrical equipment, particularly lighting equipment for bicycles, comprising an insulator; a contact member held and fastened in said insulator; at least one outside conductor leading to the exterior of said equipment; at least one inside conductor leading to the interior of said equipment; a stressing member connected to said insulator; and contoured means for holding said outside conductor detachably firm to said insulator and in electrical contact with said inside conductor by said stressing member, said outside and inside conductors having bared ends held in electrical contact under stress by said contact member; said outside conductor having an insulated end jammed between said contact member and said stressing member.

9. The cable connector as defined in claim 8 wherein said insulator has a recess, said stressing member having a front edge engaging said insulator recess, said outside conductor being jammed between said front edge and said contact member, said contact member being plate-shaped and inserted into said recess.

10. The cable connector as defined in claim 8 wherein said insulator has a recess, said contact member comprising a sleeve-shaped member, the insulated end of said outside conductor being jammed between the walls of said sleeve-shaped member and said stressing member.

11. The cable connector as defined in claim 8 wherein said stressing member comprises a plug-shaped contact rigidly connected to said insulator and disconnectable therefrom.

12. The cable connector as defined in claim 11, wherein said insulator and said stressing member are positively locked to one another.

13. The cable connector as defined in claim 12 including clip means for locking said insulator and stressing member to one another, said clip means having spring tension for holding said insulator and said stressing member in locked position.

14. The cable connector as defined in claim 12 including bayonet spring lock means for locking said insulator and stressing member to each other.

* * * * *